United States Patent
Yasuda

(10) Patent No.: US 10,083,121 B2
(45) Date of Patent: Sep. 25, 2018

(54) STORAGE SYSTEM AND STORAGE METHOD

(71) Applicant: NEC Corporation, Tokyo (JP)

(72) Inventor: Junichi Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 364 days.

(21) Appl. No.: 14/657,348

(22) Filed: Mar. 13, 2015

(65) Prior Publication Data

US 2015/0269086 A1    Sep. 24, 2015

(30) Foreign Application Priority Data

Mar. 19, 2014   (JP) ................................ 2014-056622

(51) Int. Cl.
*G06F 3/06* (2006.01)
*G06F 12/1009* (2016.01)

(52) U.S. Cl.
CPC .......... *G06F 12/1009* (2013.01); *G06F 3/065* (2013.01); *G06F 3/067* (2013.01); *G06F 3/0617* (2013.01); *G06F 3/0619* (2013.01); *G06F 2003/0692* (2013.01); *G06F 2212/657* (2013.01)

(58) Field of Classification Search
CPC ........................... G06F 17/30312; G06F 3/065
See application file for complete search history.

(56) References Cited

U.S. PATENT DOCUMENTS

| 9,052,831 B1* | 6/2015 | Stefani ................. G06F 3/0644 |
| 9,569,517 B1* | 2/2017 | Smola ............... G06F 17/30575 |
| 2013/0138646 A1 | 5/2013 | Sirer et al. |
| 2014/0337375 A1* | 11/2014 | Yue .................. G06F 17/30424 707/769 |

(Continued)

FOREIGN PATENT DOCUMENTS

| JP | 2013-037456 A | 2/2013 |
| JP | 2014-056622 A | 3/2014 |
| JP | 2014-153760 A | 8/2014 |

OTHER PUBLICATIONS

Unterreitmeier, Indexing for Sort Performance, Apr. 20, 2000, accessed Jan. 12, 2018 at http://www.itprotoday.com/microsoft-sql-server/indexing-sort-performance (Year: 2000).*

(Continued)

*Primary Examiner* — William Spieler
(74) *Attorney, Agent, or Firm* — Wilmer Cutler Pickering Hale and Dorr LLP

(57) ABSTRACT

A storage system which efficiently achieves access with different Keys is provided. A data storage unit 340 of each of data nodes 300 stores a part assigned to the data node 300 of each of main and sub tables. The main and sub tables respectively use first and second data elements as Key. When a value of one data element of the first and second data elements is inputted, the data acquisition unit 330 obtains a data set including the inputted value from the assigned part of a table that uses the one data element as Key, using the inputted value as Key. Alternatively, the data acquisition unit (Continued)

330 obtains a data set including the inputted value from the assigned part of a table that uses the other data element as Key, using a value of the other data element corresponding to the inputted value as Key.

9 Claims, 23 Drawing Sheets

(56) References Cited

U.S. PATENT DOCUMENTS

2015/0347439 A1* 12/2015 de Seabra ......... G06F 17/30117
707/692

OTHER PUBLICATIONS

"Apache HBase," retrieved online from URL:<https://hbase.apache.org/>, 3 pages (retrieved on Jun. 1, 2017).
Japanese Office Action issued by the Japan Patent Office for Japanese Application No. 2014-056622 dated Nov. 21, 2017 (7 pages).
Japanese Decision to Grant a Patent issued in Japanese Patent Application No. 2014-056622, dated Jan. 30, 2018, 4 pages.

* cited by examiner

Fig. 5

MAIN TABLE

| | Key.ID | Value | |
|---|---|---|---|
| | | NAME | ADDRESS |
| DATA NODE 300: N1 | 1 | AC | TOKYO |
| | 2 | ZZ | RUSSIA |
| | 3 | UU | USA |
| | 102 | BB | OKINAWA |
| DATA NODE 300: N2 | 201 | AB | OSAKA |
| | 202 | DD | GERMANY |
| DATA NODE 300: N3 | 301 | AA | TOYAMA |
| | 302 | CC | CHINA |

MAIN REPLICA TABLE

| Key.ID | Value | |
|---|---|---|
| | NAME | ADDRESS |
| 201 | AB | OSAKA |
| 302 | CC | CHINA |
| 1 | AC | TOKYO |
| 3 | UU | USA |
| 301 | AA | TOYAMA |
| 2 | ZZ | RUSSIA |
| 102 | BB | OKINAWA |
| 202 | DD | GERMANY |

Fig. 6

| Key:ID | DATA NODE | | |
|---|---|---|---|
| | MAIN | MAIN REPLICA | SUB |
| 1 | N1 | N2 | |
| 2 | N1 | N3 | |
| 3 | N1 | N2 | |
| 102 | N1 | N3 | |
| 201 | N2 | N1 | |
| 202 | N2 | N3 | |
| 301 | N3 | N2 | |
| 302 | N3 | N1 | |

DATA NODE 300: N1

| | MAIN TABLE | | MAIN REPLICA TABLE | | | SUB TABLE | | |
|---|---|---|---|---|---|---|---|---|
| Key:ID | Value NAME | Value ADDRESS | Key:ID | Value NAME | Value ADDRESS | Key: NAME | Value ID | Value ADDRESS |
| 1 | AC | TOKYO | 201 | AB | OSAKA | AA | 301 | TOYAMA |
| 2 | ZZ | RUSSIA | 302 | CC | CHINA | AB | 201 | OSAKA |
| 3 | UU | USA | | | | AC | 1 | TOKYO |
| 102 | BB | OKINAWA | | | | | | |

DATA NODE 300: N2

| Key:ID | NAME | ADDRESS | Key:ID | NAME | ADDRESS | Key: NAME | ID | ADDRESS |
|---|---|---|---|---|---|---|---|---|
| 201 | AB | OSAKA | 1 | AC | TOKYO | BB | 102 | OKINAWA |
| 202 | DD | GERMANY | 3 | UU | USA | CC | 302 | CHINA |
| | | | 301 | AA | TOYAMA | | | |

DATA NODE 300: N3

| Key:ID | NAME | ADDRESS | Key:ID | NAME | ADDRESS | Key: NAME | ID | ADDRESS |
|---|---|---|---|---|---|---|---|---|
| 301 | AA | TOYAMA | 2 | ZZ | RUSSIA | DD | 202 | GERMANY |
| 302 | CC | CHINA | 102 | BB | OKINAWA | UU | 3 | USA |
| | | | 202 | DD | GERMANY | ZZ | 2 | RUSSIA |

Fig. 9

MAIN TABLE

| | Key:ID | Value NAME | Value ADDRESS |
|---|---|---|---|
| DATA NODE 300: N1 | 1 | AC | TOKYO |
| | 2 | ZZ | RUSSIA |
| | 3 | UU | USA |
| | 102 | BB | OKINAWA |
| DATA NODE 300: N2 | 201 | AB | OSAKA |
| | 202 | DD | GERMANY |
| | | | |
| DATA NODE 300: N3 | 301 | AA | TOYAMA |
| | 302 | CC | CHINA |
| | | | |

MAIN REPLICA TABLE

| Key:ID | Value NAME | Value ADDRESS |
|---|---|---|
| | | |
| | | |
| | | |
| | | |
| 1 | AC | TOKYO |
| | | |
| | | |
| | | |
| | | |
| | | |

SUB TABLE

| Key: NAME | Value ID | Value ADDRESS |
|---|---|---|
| AA | 301 | TOYAMA |
| AB | 201 | OSAKA |
| AC | 1 | TOKYO |
| | | |
| BB | 102 | OKINAWA |
| CC | 302 | CHINA |
| | | |
| DD | 202 | GERMANY |
| UU | 3 | USA |
| ZZ | 2 | RUSSIA |

| Key.ID | DATA NODE | | |
|---|---|---|---|
| | MAIN | MAIN REPLICA | SUB |
| 1 | N1 | N2 | N1 |
| 2 | N1 | | N3 |
| 3 | N1 | | N3 |
| 102 | N2 | | N2 |
| 201 | N2 | | N1 |
| 301 | N3 | | N1 |
| 302 | N3 | | N2 |

222

| Key: 名前 | Key.ID | DATA NODE | | |
|---|---|---|---|---|
| | | SUB | MAIN | MAIN REPLICA |
| AA | 301 | N1 | N3 | |
| AB | 201 | N1 | N2 | |
| AC | 1 | N2 | N1 | N2 |
| BB | 102 | N2 | N1 | |
| CC | 302 | N3 | N3 | |
| DD | 202 | N3 | N2 | |
| UU | 3 | N3 | N1 | |
| ZZ | 2 | N3 | N1 | |

Fig. 11

DATA NODE 300: N1

MAIN TABLE

| Key:ID | Value | |
|---|---|---|
| | NAME | ADDRESS |
| 1 | AC | TOKYO |
| 2 | ZZ | RUSSIA |
| 3 | UU | USA |
| ... | ... | ... |
| 102 | BB | OKINAWA |

B1

DATA NODE 300: N2

| Key:ID | Value | |
|---|---|---|
| | NAME | ADDRESS |
| 201 | AB | OSAKA |
| 202 | DD | GERMANY |
| 299 | AD | NAGOYA |
| ... | ... | ... |

B2

DATA NODE 300: N3

| Key:ID | Value | |
|---|---|---|
| | NAME | ADDRESS |
| 301 | AA | TOYAMA |
| 302 | CC | CHINA |
| ... | ... | ... |

B3

MAIN REPLICA TABLE

| Key:ID | Value | |
|---|---|---|
| | NAME | ADDRESS |
| 301 | AA | TOYAMA |
| 302 | CC | CHINA |
| ... | ... | ... |

B3

| Key:ID | Value | |
|---|---|---|
| | NAME | ADDRESS |
| 1 | AC | TOKYO |
| 2 | ZZ | RUSSIA |
| 3 | UU | USA |
| ... | ... | ... |
| 102 | BB | OKINAWA |

B1

| Key:ID | Value | |
|---|---|---|
| | NAME | ADDRESS |
| 201 | AB | OSAKA |
| 202 | DD | GERMANY |
| 299 | AD | NAGOYA |
| ... | ... | ... |

B2

□ : BLOCK

Fig. 12

| Key:ID | DATA NODE | | |
| --- | --- | --- | --- |
| | MAIN | MAIN REPLICA | SUB |
| 1 | N1/B1 | N2/B1 | |
| 2 | N1/B1 | N2/B1 | |
| 3 | N1/B1 | N2/B1 | |
| 102 | N1/B1 | N2/B1 | |
| 201 | N2/B2 | N3/B2 | |
| 202 | N2/B2 | N3/B2 | |
| 299 | N2/B2 | N3/B2 | |
| 301 | N3/B3 | N1/B3 | |
| 302 | N3/B3 | N1/B3 | |

MAIN TABLE

| | Key:ID | Value | |
|---|---|---|---|
| | | NAME | ADDRESS |
| B1 | 1 | AC | TOKYO |
| | 2 | ZZ | RUSSIA |
| | 3 | UU | USA |
| | 102 | BB | OKINAWA |
| B2 | 201 | AB | OSAKA |
| | 202 | DD | GERMANY |
| | 299 | AD | NAGOYA |
| B3 | 301 | AA | TOYAMA |
| | 302 | CC | CHINA |

DATA NODE 300: N1 / N2 / N3

MAIN REPLICA TABLE

| | Key:ID | Value | |
|---|---|---|---|
| | | NAME | ADDRESS |
| B3 | 301 | AA | TOYAMA |
| | 302 | CC | CHINA |
| B1 | 1 | AC | TOKYO |
| | 2 | ZZ | RUSSIA |
| | 3 | UU | USA |
| | 102 | BB | OKINAWA |
| B2 | 201 | AB | OSAKA |
| | 202 | DD | GERMANY |
| | 299 | AD | NAGOYA |

SUB TABLE

| | Key:NAME | Value | |
|---|---|---|---|
| | | ID | ADDRESS |
| B3 | AA | 301 | TOYAMA |
| | CC | 302 | CHINA |
| B1 | AC | 1 | TOKYO |
| | BB | 102 | OKINAWA |
| | UU | 3 | USA |
| | ZZ | 2 | RUSSIA |
| B2 | AB | 201 | OSAKA |
| | AD | 299 | NAGOYA |
| | DD | 202 | GERMANY |

BLOCK

Fig. 15

| | | MAIN TABLE | | |
|---|---|---|---|---|
| | | Key:ID | NAME | Value ADDRESS |
| DATA NODE 300: N1 | B1 | 1 | AC | TOKYO |
| | | 2 | ZZ | RUSSIA |
| | | 3 | UU | USA |
| | | 102 | BB | OKINAWA |
| DATA NODE 300: N2 | B2 | 201 | AB | OSAKA |
| | | 202 | DD | GERMANY |
| | | 299 | AD | NAGOYA |
| DATA NODE 300: N3 | B3 | 301 | AA | TOYAMA |
| | | 302 | CC | CHINA |

| MAIN REPLICA TABLE | | | |
|---|---|---|---|
| Key:ID | NAME | Value ADDRESS | |
| | | | |

| | | SUB TABLE | | |
|---|---|---|---|---|
| | | Key: NAME | ID | Value ADDRESS |
| | B3 | AA | 301 | TOYAMA |
| | | CC | 302 | CHINA |
| | B1 | AC | 1 | TOKYO |
| | | BB | 102 | OKINAWA |
| | | UU | 3 | USA |
| | | ZZ | 2 | RUSSIA |
| | B2 | AB | 201 | OSAKA |
| | | AD | 299 | NAGOYA |
| | | DD | 202 | GERMANY |

⋯ BLOCK

Fig. 16

Table 221:

| Key:ID | DATA NODE | | |
|---|---|---|---|
| | MAIN | MAIN REPLICA | SUB |
| 1 | N1/B1 | | N2/B1 |
| 2 | N1/B1 | | N2/B1 |
| 3 | N1/B1 | | N2/B1 |
| 102 | N1/B1 | | N2/B1 |
| 201 | N2/B2 | | N3/B2 |
| 202 | N2/B2 | | N3/B2 |
| 299 | N2/B2 | | N3/B2 |
| 301 | N3/B3 | | N1/B3 |
| 302 | N3/B3 | | N1/B3 |

Table 222:

| Key: NAME | Key:ID | DATA NODE | | |
|---|---|---|---|---|
| | | SUB | MAIN | MAIN REPLICA |
| AA | 301 | N1/B3 | N3/B3 | |
| AB | 201 | N3/B2 | N2/B2 | |
| AC | 1 | N2/B1 | N1/B1 | |
| AD | 299 | N3/B2 | N2/B2 | |
| BB | 102 | N2/B1 | N1/B1 | |
| CC | 302 | N1/B3 | N3/B3 | |
| DD | 202 | N3/B2 | N2/B2 | |
| UU | 3 | N2/B1 | N1/B1 | |
| ZZ | 2 | N2/B1 | N1/B1 | |

Fig. 19

MAIN TABLE

| | Key:ID | Value | |
|---|---|---|---|
| | | NAME | ADDRESS |
| B1 / DATA NODE 300: N1 | 1 | AC | TOKYO |
| | 2 | ZZ | RUSSIA |
| | 3 | UU | USA |
| | 102 | BB | OKINAWA |
| B2 / DATA NODE 300: N2 | 201 | AB | OSAKA |
| | 202 | DD | GERMANY |
| | 299 | AD | NAGOYA |
| B3 / DATA NODE 300: N3 | 301 | AA | TOYAMA |
| | 302 | CC | CHINA |
| | | | |

MAIN REPLICA TABLE

| | Key:ID | Value | |
|---|---|---|---|
| | | NAME | ADDRESS |
| B3 | 301 | AA | TOYAMA |
| | 302 | CC | CHINA |
| | | | |
| B1 | 1 | AC | TOKYO |
| | 2 | ZZ | RUSSIA |
| | 3 | UU | USA |
| | 102 | BB | OKINAWA |
| B2 | 201 | AB | OSAKA |
| | 202 | DD | GERMANY |
| | 299 | AD | NAGOYA |

SUB TABLE

| | Key: NAME | Value | |
|---|---|---|---|
| | | ID | ADDRESS |
| B3 | AA | 301 | TOYAMA |
| | CC | 302 | CHINA |
| | | | |
| B2 | AB | 201 | OSAKA |
| | AD | 299 | NAGOYA |
| | DD | 202 | GERMANY |
| B1 | AC | 1 | TOKYO |
| | BB | 102 | OKINAWA |
| | UU | 3 | USA |
| | ZZ | 2 | RUSSIA |

⸬ : BLOCK

| Key:ID | DATA NODE | | |
|---|---|---|---|
| | MAIN | MAIN REPLICA | SUB |
| 1 | N1/B1 | N2/B1 | N3/B1 |
| 2 | N1/B1 | N2/B1 | N3/B1 |
| 3 | N1/B1 | N2/B1 | N3/B1 |
| 102 | N1/B1 | N2/B1 | N3/B1 |
| 201 | N2/B2 | N3/B2 | N2/B2 |
| 202 | N2/B2 | N3/B2 | N2/B2 |
| 299 | N2/B2 | N3/B2 | N2/B2 |
| 301 | N3/B3 | N1/B3 | N1/B3 |
| 302 | N3/B3 | N1/B3 | N1/B3 |

222

| Key:NAME | Key:ID | DATA NODE | | |
|---|---|---|---|---|
| | | SUB | MAIN | MAIN REPLICA |
| AA | 301 | N1/B3 | N3/B3 | N1/B3 |
| AB | 201 | N2/B2 | N2/B2 | N3/B2 |
| AC | 1 | N3/B1 | N1/B1 | N2/B1 |
| AD | 299 | N2/B2 | N2/B2 | N3/B2 |
| BB | 102 | N3/B1 | N1/B1 | N2/B1 |
| CC | 302 | N1/B3 | N3/B3 | N1/B3 |
| DD | 202 | N2/B2 | N2/B2 | N3/B2 |
| UU | 3 | N3/B1 | N1/B1 | N2/B1 |
| ZZ | 2 | N3/B1 | N1/B1 | N2/B1 |

Fig. 21

DATA NODE 300: N1 — MAIN TABLE

| | Key:ID | Name | Value Address |
|---|---|---|---|
| B1 | 1 | AC | TOKYO |
| | 2 | ZZ | RUSSIA |
| | 3 | UU | USA |
| | 102 | BB | OKINAWA |
| B2 | 201 | AB | OSAKA |
| | 202 | DD | GERMANY |
| | 299 | AD | NAGOYA |
| B3 | 301 | AA | TOYAMA |
| | 302 | CC | CHINA |

DATA NODE 300: N2 — MAIN REPLICA TABLE

| | Key:ID | Name | Value Address |
|---|---|---|---|
| B2 | 201 | AB | OSAKA |
| | 202 | DD | GERMANY |
| | 299 | AD | NAGOYA |

DATA NODE 300: N3 — SUB TABLE

| | Key:NAME | ID | Value Address |
|---|---|---|---|
| B3 | AA | 301 | TOYAMA |
| | CC | 302 | CHINA |
| B2 | AB | 201 | OSAKA |
| | AD | 299 | NAGOYA |
| | DD | 202 | GERMANY |
| B1 | AC | 1 | TOKYO |
| | BB | 102 | OKINAWA |
| | UU | 3 | USA |
| | ZZ | 2 | RUSSIA |

⬚ : BLOCK

STORAGE SYSTEM AND STORAGE METHOD

This application is based upon and claims the benefit of priority from Japanese Patent Application No. 2014-056622, filed on Mar. 19, 2014, the disclosure of which is incorporated herein in its entirety by reference.

TECHNICAL FIELD

The present invention relates to a storage system and a storage method, and in particular, relates to a storage system and a storage method, which distribute and store a plurality of data sets.

BACKGROUND ART

As the performance of hardware, software, and a communication network is improved, a technique to obtain high processing performance by performing distributed processing with a plurality of computers connected by the network has been developed.

In particular, recently, as a distributed processing technique is developed, a distributed parallel processing infrastructure capable of fast analyzing large quantities of data is provided, and it is applied to derivation of a tendency and knowledge with respect to large quantities of data. For example, Hadoop that is well known as a distributed parallel processing infrastructure is applied to mining of customer information and an action history, a trend analysis of large quantities of log information, and the like. In Hadoop, HDFS (Hadoop Distributed File System) is used as a distributed file system that deals with large quantities of data. In addition, as a scalable and high-performance distributed storage built on HDFS, HBase described in "Apache Hbase", The Apache Software Foundation, [online], [retrieved on Mar. 5, 2014], the Internet <URL:http://hbase.apache.org/>is known.

HBase is a distributed storage using a KVS (Key-Value Store) technique. In HBase, a table data structure is used, and with Key called RowKey, Values of data sets correlated with the RowKey can be uniquely obtained. In addition, in HBase, the data sets are divided into a plurality of files each including a certain range of RowKey values, and stored in a plurality of nodes. In addition, in HBase, the data sets are sorted in dictionary order of RowKey values (for example, natural order) and stored. Thus, range retrieval with Key is fast performed.

In addition, in such a distributed storage, copies (replicas) of the data sets are generally stored in the plurality of nodes so as to achieve high availability. Accordingly, even when failures occur in one node, a node including a replica takes over processing, and thus, fault tolerance is increased.

SUMMARY

An exemplary object of the present invention is to provide a storage system and a storage method, which efficiently achieve access with different Keys.

A storage system according to an exemplary aspect of the invention includes a plurality of data nodes, wherein each of the plurality of data nodes includes: a data storage unit that stores a part assigned to the data node of each of first and second tables each of which stores a plurality of data sets, the first and second tables respectively using first and second data elements among a plurality of data elements of a data set as Key; and a data acquisition unit that obtains, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses the other data element as Key among the first and second tables, using a value of the other data element corresponding to the inputted value as Key, and outputs the obtained data set.

A storage method for a storage system including a plurality of data nodes, according to an exemplary aspect of the invention includes: in each of the plurality of data nodes, storing a part assigned to the data node of each of first and second tables each of which stores a plurality of data sets, the first and second tables respectively using first and second data elements among a plurality of data elements of a data set as Key; obtaining, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses the other data element as Key among the first and second tables, using a value of the other data element corresponding to the inputted value as Key; and outputting the obtained data set.

A non-transitory computer readable storage medium according to an exemplary aspect of the invention records thereon a program for a storage system including a plurality of data nodes, causing a computer of each of the plurality of data nodes to perform a method including: storing a part assigned to the data node of each of first and second tables each of which stores a plurality of data sets, the first and second tables respectively using first and second data elements among a plurality of data elements of a data set as Key; obtaining, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses the other data element as Key among the first and second tables, using a value of the other data element corresponding to the inputted value as Key; and outputting the obtained data set.

BRIEF DESCRIPTION OF THE DRAWINGS

Exemplary features and advantages of the present invention will become apparent from the following detailed description when taken with the accompanying drawings in which:

FIG. 5 is a diagram illustrating an example of tables in the first exemplary embodiment of the present invention;

FIG. 6 is a diagram illustrating an example of pieces of Key information 221, 222 in the first exemplary embodiment of the present invention;

FIG. 7 is a diagram illustrating another example of the tables in the first exemplary embodiment of the present invention;

FIG. 9 is a diagram illustrating another example of the tables in the first exemplary embodiment of the present invention;

FIG. 10 is a diagram illustrating another example of the pieces of Key information 221, 222 in the first exemplary embodiment of the present invention;

FIG. 11 is a diagram illustrating an example of tables in a second exemplary embodiment of the present invention;

FIG. 12 is a diagram illustrating an example of pieces of Key information 221, 222 in the second exemplary embodiment of the present invention;

FIG. 13 is a diagram illustrating another example of the tables in the second exemplary embodiment of the present invention;

FIG. 15 is a diagram illustrating another example of the tables in the second exemplary embodiment of the present invention;

FIG. 16 is a diagram illustrating another example of the pieces of Key information 221, 222 in the second exemplary embodiment of the present invention;

FIG. 19 is a diagram illustrating an example of tables in the third exemplary embodiment of the present invention;

FIG. 20 is a diagram illustrating an example of pieces of Key information 221, 222 in the third exemplary embodiment of the present invention;

FIG. 21 is a diagram illustrating an example of the tables in the third exemplary embodiment of the present invention;

EXEMPLARY EMBODIMENT (First Exemplary Embodiment)

A first exemplary embodiment of the present invention will be described.

Figure 2:
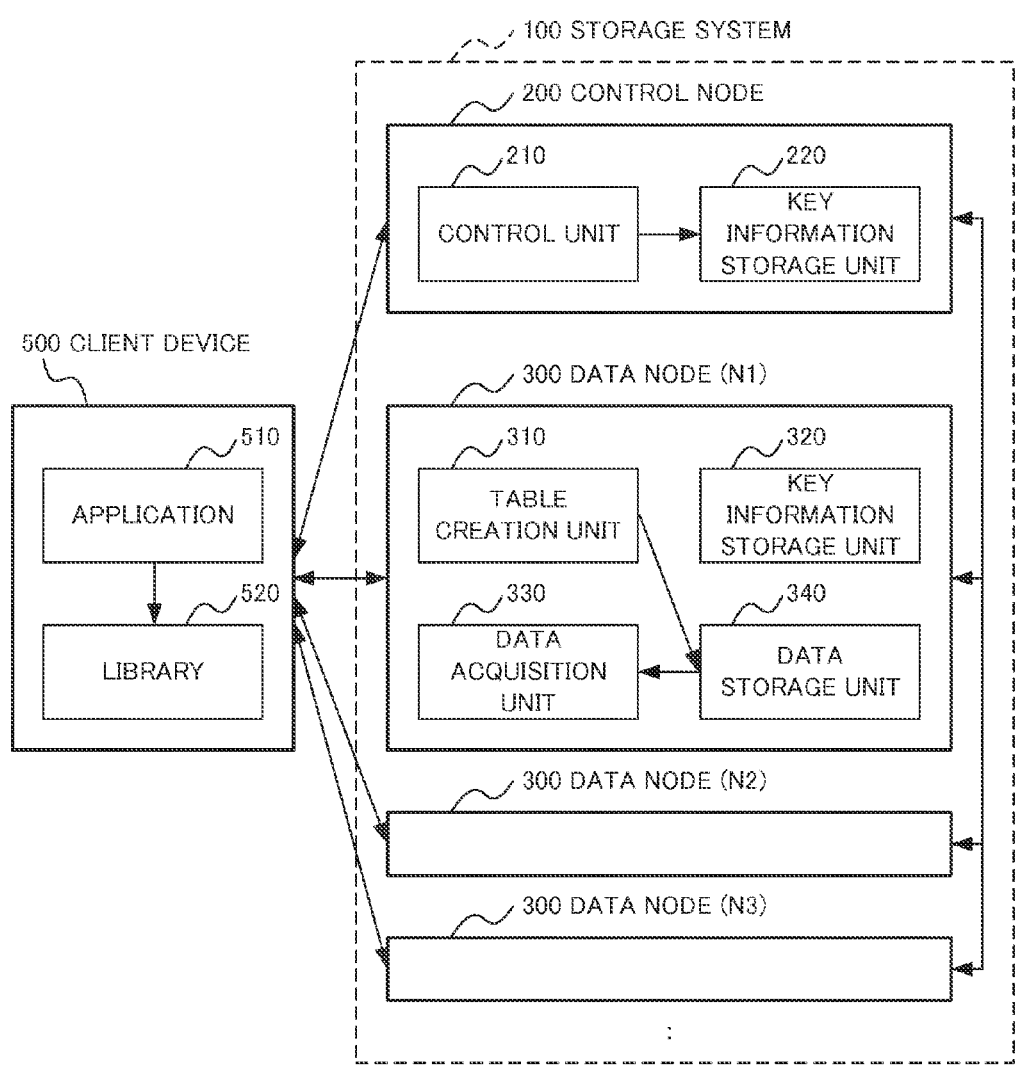
FIG. 2 is a block diagram illustrating the structure of the first exemplary embodiment of the present invention.

First, a structure of the first exemplary embodiment of the present invention will be described. FIG. 2 is a block diagram illustrating the structure of the first exemplary embodiment of the present invention.

Referring to FIG. 2, a storage system 100 includes a control node 200 and a plurality of data nodes 300. The storage system 100 is connected to a client device 500 over a network or the like.

It is to be noted that, in the following description, a code in quotation marks, which follows the reference numeral, indicates an identifier. For example, a data node 300 "N1" indicates a data node 300 having an identifier "N1". In the example of FIG. 2, the storage system 100 includes data nodes 300 "N1", "N2", "N3", . . . .

In the first exemplary embodiment of the present invention, the storage system 100 stores a plurality of data sets, and each data set includes a plurality of data elements. In the storage system 100, a table that stores a plurality of data sets is created. In the table, one data element among a plurality of data elements of a data set is used as Key. In the storage system 100, a Key value is input from the client device 500, and a data set including the Key value is obtained and outputted from the table.

In the first exemplary embodiment of the present invention, as a table, a main table (first table) that uses a first element among a plurality of data elements as Key is created in advance. In the main table, data sets are sorted depending on Key values of the main table (arranged in order of Key values). Then, the main table is divided into a plurality of parts each of which includes one or more data sets, and the respective parts are assigned to (stored in) the plurality of data nodes 300.

In addition, a main replica table (third table) that uses the first element as Key is also created in advance. In the main replica table, each data set of the main table is stored in data nodes 300 different from the node storing the data set for the main table in Key unit.

FIG. 5 is a diagram illustrating an example of tables in the first exemplary embodiment of the present invention. In the example of FIG. 5, a data set includes, as data elements, ID (Identifier), Name, and Address. A main table and a main replica table are tables that use ID as Key. The main table is divided into three parts, and they are stored in the data nodes 300 "N1", "N2", and "N3". In addition, for example, a data set with respect to Key: ID "1" is stored in the data node 300 "N1" in the form of <Key: ID "1", Value: Name "AC", Address "Tokyo">. In addition, in the main replica table, the data set with respect to Key: ID "1" is stored in the data node 300 "N2".

Furthermore, a sub table (second table) that uses a second element different from the first element as Key is created. Also in the sub table, as in the main table, data sets are sorted depending on Key values of the sub table. Then, the sub table is also divided into a plurality of parts each of which includes one or more data sets, and they are respectively assigned to (stored in) the plurality of data nodes 300.

FIG. 7 and FIG. 9 are diagrams illustrating other examples of the tables in the first exemplary embodiment of the present invention. In the examples of FIG. 7 and FIG. 9, in addition to the main table and the main replica table of FIG. 5, a sub table that uses Name as Key is added. The sub table is also divided into three parts, and they are stored in the data nodes 300 "N1", "N2", and "N3". In addition, for example, in the sub table, a data set with respect to Key: Name "AC" is stored in the data node 300 "N1" in the form of <Key: Name "AC", Value: ID "1", Address "Tokyo">.

It is to be noted that, in the exemplary embodiments of the present invention, when a data set that is the same as a data set stored in a certain data node 300 in a certain table is stored in another data node 300 in another table, one data set is referred to as a replica of the other data set.

For example, in FIG. 7, the data set of Key: ID "1" stored in the data node 300 "N2" in the main replica table is a replica of the data set of Key: ID "1" stored in the data node 300 "N1" in the main table. In addition, in FIG. 7, the data set of Key: Name "AA" stored in the data node 300 "N1" in the sub table is a replica of the data set of Key: ID "301" stored in the data node 300 "N3" in the main table.

When failures occur in a certain data node 300, from a data node 300 that stores a replica of a data set stored in the certain data node 300, the replica of the data set can be obtained.

The control node 200 includes a control unit 210 and a Key information storage unit 220.

The control unit 210 instructs each data node 300 to create a part assigned to the data node 300 in the sub table. In addition, the control unit 210 monitors the state of each data node 300 by alive monitoring or the like.

The Key information storage unit 220 stores pieces of Key information 221, 222. Each of the pieces of Key information 221, 222 indicates a data node 300 that stores a data set including each Key value of the main table or the sub table.

Figure 8:
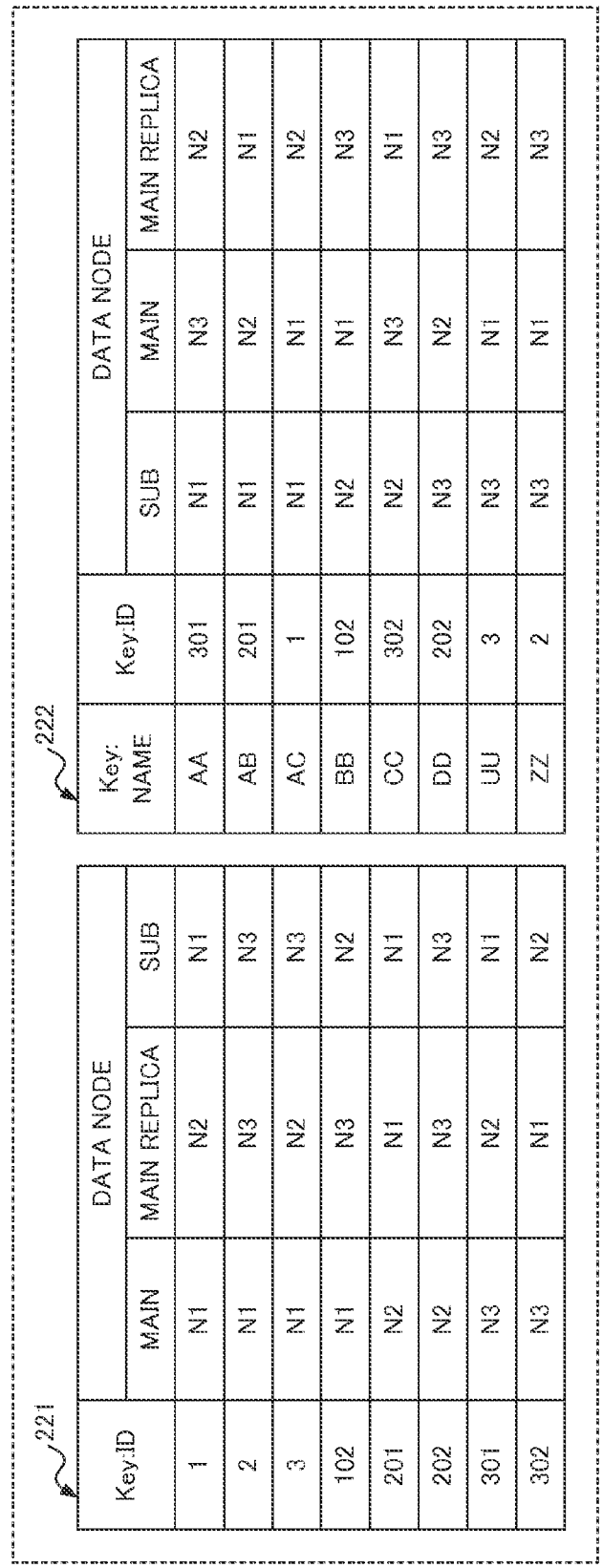
FIG. 8 is a diagram illustrating another example of the pieces of Key information 221, 222 in the first exemplary embodiment of the present invention.

FIG. 6, FIG. 8, and FIG. 10 are diagrams illustrating examples of pieces of Key information 221, 222 in the first exemplary embodiment of the present invention. The Key information 221 of FIG. 6 corresponds to the tables of FIG. 5. The pieces of Key information 221, 222 of FIG. 8 and FIG. 10 correspond to the tables of FIG. 7 and FIG. 9, respectively.

Each of the "main", "main replica", and "sub" columns in the Key information 221 indicates an identifier of the data node 300 that stores a data set including a Key value of the "Key: ID" column in the main table, the main replica table, or the sub table.

Each of the "sub", "main", and "main replica" columns in the Key information 222 indicates an identifier of the data node 300 that stores a data set including a Key value of the "Key: Name" column in the sub table, the main table, or the main replica table. The "Key: ID" column indicates an ID value included in the data set including a Key value of the "Key: Name" column (mapping of the Key value of the main table with respect to the Key value of the sub table).

Each of the plurality of data nodes 300 includes a table creation unit 310, a Key information storage unit 320, a data acquisition unit 330, and a data storage unit 340.

The table creation unit 310 creates the part assigned to the data node 300 in the sub table, in the data storage unit 340, according to the instruction from the control node 200. The table creation unit 310 stores the respective data sets of the assigned part in the sub table in the data storage unit 340, in the sorted order in the sub table.

The Key information storage unit 320 stores the pieces of Key information 221, 222 as in the control node 200. The pieces of Key information 221, 222 in the Key information storage unit 320 are synchronized with the Key information storage unit 220 by the control unit 210.

The data acquisition unit 330 obtains a data set including a Key value from the part assigned to the data node 300 in each table, depending on a data acquisition request from the client device 500, and returns the obtained data set to the client device 500.

The data storage unit 340 stores the part assigned to the data node 300 in each table. The data storage unit 340 may be a storage device in distributed storage in accordance with HBase. The data storage unit 340 may use a HDD (Hard Disk Drive), and may use a SSD (Solid state drive), a flash memory, or a RAM (Random Access Memory), as a storage medium.

The client device 500 includes an application 510 and a library 520.

The application 510 accesses the storage system 100 using the library 520.

The library 520 accesses the storage system 100, and reads and writes a data set.

It is to be noted that each of the control node 200, the data node 300, and the client device 500 may be a computer that includes a CPU (Central Processing Unit) and a storage medium storing a program, and operates by control based on the program.

In this case, the CPU of the control node 200 executes a computer program for achieving a function of the control unit 210. In addition, the CPU of the data node 300 executes a computer program for achieving functions of the table creation unit 310 and the data acquisition unit 330. The CPU of the client device 500 executes a computer program for achieving functions of the application 510 and the library 520. In addition, the storage medium of the control node 200 stores information of the Key information storage unit 220.

The storage medium of the data node 300 stores information of the Key information storage unit 320 and the data storage unit 340.

Next, operation of the first exemplary embodiment of the present invention will be described.

<Sub Table Creation Processing>

First, sub table creation processing in the first exemplary embodiment of the present invention will be described.

It is assumed that the main table and the main replica table that use ID as Key are stored in the data storage unit 340 of each data node 300, as in FIG. 5. In addition, it is assumed that, with respect to these tables, the Key information 221 as in FIG. 6 is stored in the Key information storage unit 220.

Figure 3:
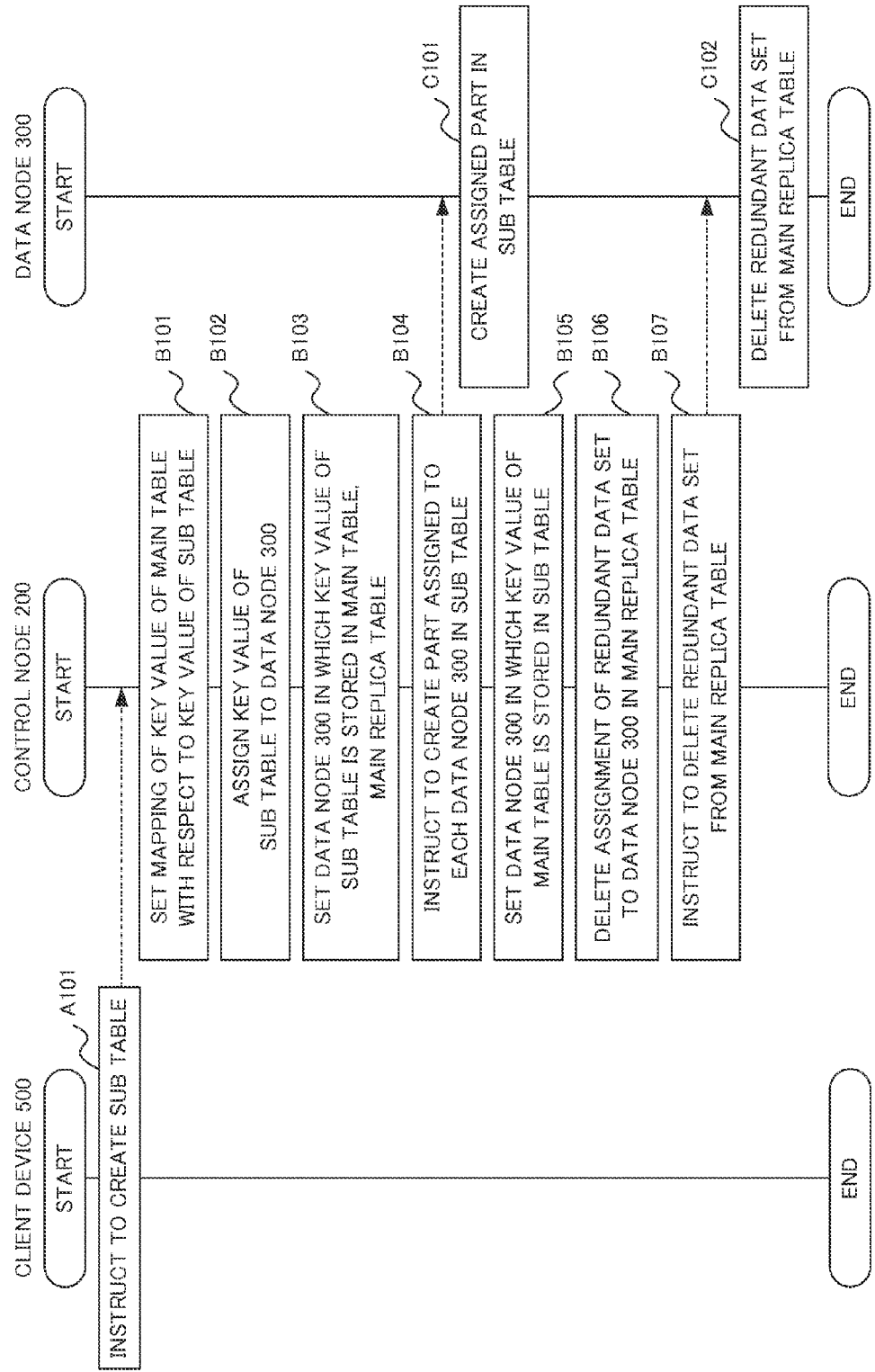
FIG. 3 is a flowchart illustrating sub table creation processing in the first exemplary embodiment of the present invention.

FIG. 3 is a flowchart illustrating sub table creation processing in the first exemplary embodiment of the present invention.

The application 510 of the client device 500 instructs the control node 200 of the storage system 100 to create a sub table, via the library 520 (Step A101).

For example, the application 510 instructs to create a sub table that uses Name as Key.

The control unit 210 of the control node 200 sets a correspondence relationship (mapping) between a Key value of the sub table and a Key value of the main table corresponding to the Key value of the sub table, in the Key information 222 (Step B101). The control unit 210 obtains each Key value of the main table from the Key information 221, and obtains a data set corresponding to the Key value from the data node 300 that stores the Key value. Then, the control unit 210 extracts a Key value of the sub table from the obtained data set. The control unit 210 sets a Key value of the main table with respect to each Key value of the sub table while sorting by the extracted Key value of the sub table.

For example, the control unit 210 sets mapping of a value of Key: ID with respect to each value of Key: Name, as in the Key information 222 of FIG. 8, based on the Key information 221 of FIG. 6.

The control unit 210 assigns each Key value of the sub table to the data node 300, in the Key information 222 (Step B102). The control unit 210 assigns Key values whose number in each data node 300 is determined in advance to each data node 300 in order, from the first Key value, in the Key information 222.

For example, the control unit 210 assigns Key: Name "AA" to "AC" to the data node 300 "N1", assigns Key: Name "BB" and "CC" to the data node 300 "N2", and assigns Key: Name "DD" to "ZZ" to the data node 300 "N3", in the Key information 222 of FIG. 8. The control unit 210 sets the assignment result in the Key information 222, as in FIG. 8.

The control unit 210 sets, with respect to each Key value of the sub table, the data node 300 in which a data set including the value is stored in the main table or the main replica table, in the Key information 222 (Step B103). The control unit 210 extracts a Key value of the main table with respect to each Key value of the sub table, from the Key information 222. Then, the control unit 210 extracts an identifier of the data node 300 in which the Key value of the main table is stored in the main table or the main replica table, from the Key information 221.

For example, the control unit 210 sets an identifier of the data node 300 in which each value of Key: Name is stored in the main table or the main replica table, as in the Key information 222 of FIG. 8, based on the Key information 221 of FIG. 6.

The control unit 210 instructs each data node 300 to create a part with respect to Key assigned to the data node 300 in the sub table (Step B104).

The table creation unit 310 of each data node 300 creates the assigned part with respect to Key in the sub table, in the data storage unit 340 (Step C101). The table creation unit 310 of each data node 300 extracts assigned Key values of the sub table in the Key information 222 in order. Then, the table creation unit 310 obtains data sets with respect to the Key values from the main table or the main replica table of the own data node 300 or other data nodes 300, and stores the obtained data sets in the sub table in the data storage unit 340 in order.

For example, the table creation unit 310 of the data node 300 "N1" obtains a data set with respect to Key: Name "AA" in the Key information 222 of FIG. 8 from the main replica table of the data node 300 "N2". The table creation unit 310 converts a data set obtained from the main replica table <Key: ID "301", Value: Name "AA", Address "Toyama">into <Key: Name "AA", Value: ID "301", Address "Toyama">. The table creation unit 310 stores the converted data set in the sub table in the data storage unit 340, as in FIG. 7. Similarly, the table creation unit 310 stores a data set with respect to Key: Name "AB" next to the data set of Key: Name "AA" in the data storage unit 340. Furthermore, the table creation unit 310 stores a data set with respect to Key: Name "AC" next to the data set of Key: Name "AB" in the data storage unit 340. Similarly, the data nodes 300 "N2" and "N3" also store the assigned parts in the sub table in the data storage unit 340. As a result, the sub table is created and stored in the data nodes 300 "N1", "N2", and "N3", as in FIG. 7.

The control unit 210 sets, with respect to each Key value of the main table, the data node 300 in which a data set including the value is stored in the sub table, in the Key information 221 (Step B105). The control unit 210 extracts a Key value of the sub table with respect to each Key value of the main table, from the Key information 222. Then, the control unit 210 extracts an identifier of the data node 300 in which the Key value of the sub table is stored in the sub table, from the Key information 222.

For example, the control unit 210 sets an identifier of the data node 300 in which each value of Key: ID is stored in the sub table, as in the Key information 221 of FIG. 8, based on the Key information 222 of FIG. 8.

The control unit 210 deletes the assignment of a redundant data set to the data node 300 in the main replica table, from the pieces of Key information 221, 222 (Step B106). The redundant data set is a data set stored in different data nodes 300 in the main table and the sub table among data sets stored in the main replica table. In this case, the data set in the sub table can be used as a replica of the data set in the main table. Thus, the data set in the main replica table can be deleted.

For example, in the Key information 221 of FIG. 8, a data set with respect to Key: ID "2" (Key: Name "ZZ") is stored in the data node 300 "N1" in the main table, and in the data node 300 "N3" in the sub table. Thus, a data set of Key: ID "2" stored by the data node 300 "N3" in the main replica table is redundant.

The control unit 210 deletes the assignment of a redundant data set to the data node 300 in the main replica table, from the pieces of Key information 221, 222, as in FIG. 10

The control unit 210 instructs each data node 300 to delete the redundant data set from the main replica table (Step B107).

The table creation unit 310 of each data node 300 deletes the redundant data set from the assigned part in the main replica table in accordance with the pieces of Key information 221, 222 updated at Step B106 (Step C102).

For example, the table creation unit 310 of each data node 300 deletes redundant data sets from the main replica table, as in FIG. 9.

<Data Readout Processing>

Next, data readout processing in the first exemplary embodiment of the present invention will be described.

The operation will be described by taking the case where the application 510 of the client device 500 performs acquisition of data sets with respect to Key values in a specific range (range retrieval) for the storage system 100, as an example.

Figure 4:
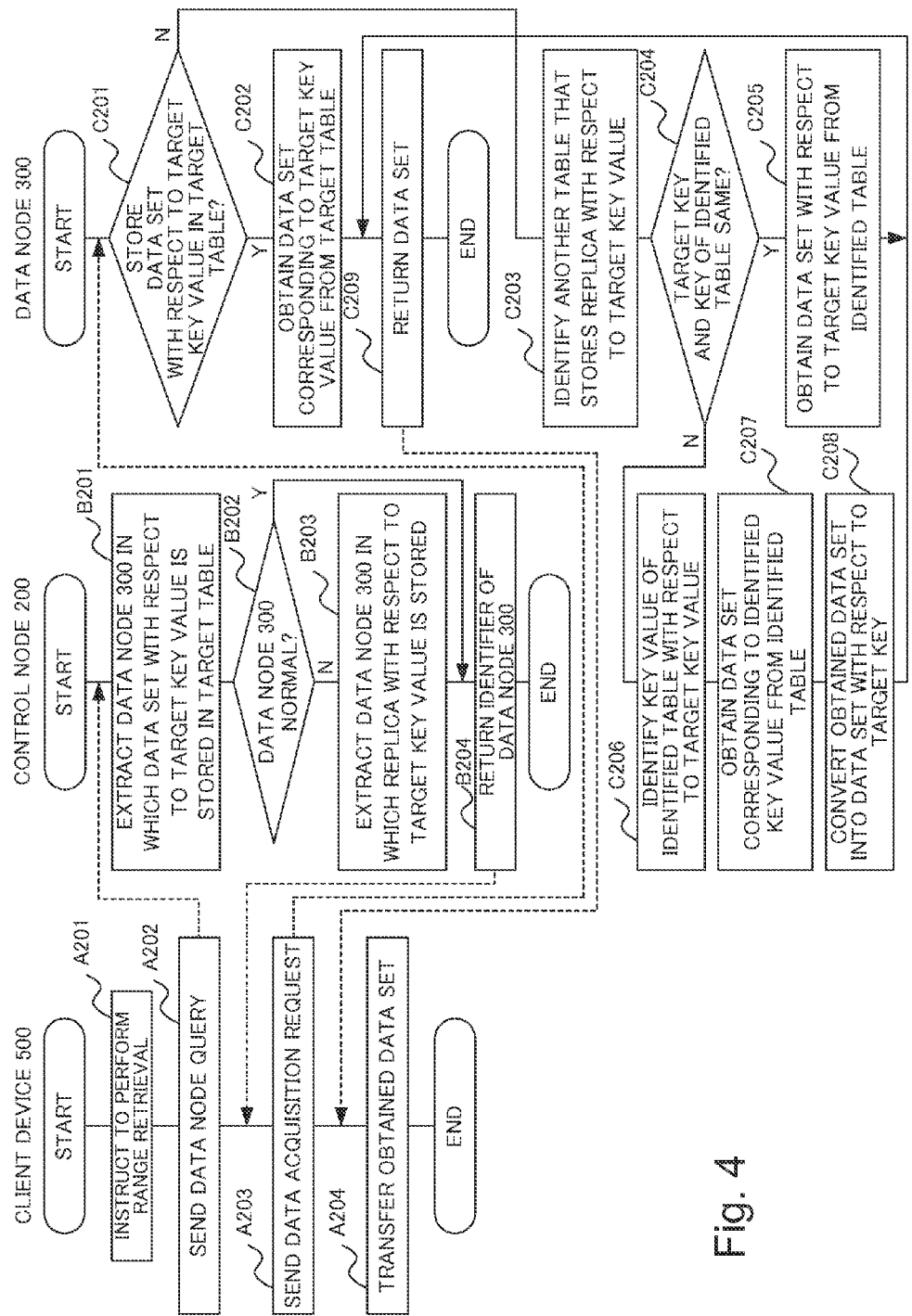
FIG. 4 is a flowchart illustrating data readout processing in the first exemplary embodiment of the present invention.

FIG. 4 is a flowchart illustrating data readout processing in the first exemplary embodiment of the present invention.

The application 510 of the client device 500 specifies a retrieval target table (main table/sub table) (hereinafter, target table) and a retrieval target Key (hereinafter, target Key) value, and instructs the library 520 to perform range retrieval (Step A201). The library 520 specifies the target table and the target Key value, and sends a data node query to the control node 200 (Step A202).

For example, when the application 510 instructs to perform range retrieval of Key: ID "1" to "102" in the main table, the library 520 sends a data node query with target table: main table and target Key: ID "1" to "102".

The control unit 210 of the control node 200 refers to the pieces of Key information 221, 222 according to the target Key, and extracts an identifier of the data node 300 in which a data set with respect to the target Key value is stored in the target table (Step B201).

For example, the control unit 210 refers to the Key information 221 of FIG. 10, and extracts the identifier "N1" of the data node 300 in which data sets with respect to Key: ID "1" to "102" are stored in the main table.

The control unit 210 determines whether or not the extracted data node 300 is normal (Step B202).

When the data node 300 is normal at Step B202 (Step B202/Y), the control unit 210 returns the identifier of the extracted data node 300 to the client device 500 (Step B204).

For example, when the data node 300 "N1" is normal, the control unit 210 returns the identifier "N1" of the data node 300 with respect to Key: ID "1" to "102".

The library 520 of the client device 500 specifies the target table (main table/sub table) and the target Key value, and sends a data acquisition request to the data node 300 of the received identifier (Step A203).

For example, the library 520 sends a data acquisition request to the data node 300 "N1" with target table: main table and target Key: ID "1" to "102".

The data acquisition unit 330 of the data node 300 refers to the pieces of Key information 221, 222 according to the target Key, and determines whether the own data node 300 stores a data set with respect to the target Key value in the target table (Step C201).

When the data set with respect to the target Key value is stored in the target table at Step C201 (Step C201/Y), the data acquisition unit 330 obtains the data set with respect to the target Key value (Step C202). The data acquisition unit 330 obtains the data set from the target table stored in the data storage unit 340.

For example, referring to the Key information 221 of FIG. 10, the data node 300 "N1" stores the data sets with respect to Key: ID "1" to "102" in the main table. The data acquisition unit 330 of the data node 300 "N1" obtains the data set with respect to Key: ID "1" <Key: ID "1", Value: Name "AC", Address "Tokyo">from the main table in FIG. 9. Similarly, the data acquisition unit 330 obtains the data sets with respect to Key: ID "2" to "102".

The data acquisition unit 330 returns the obtained data set to the client device 500 (Step C209).

For example, the data acquisition unit 330 returns the data sets with respect to Key: ID "1" to "102" to the client device 500.

The library 520 transfers the obtained data set to the application 510 (Step A204).

For example, the library 520 transfers the data sets with respect to Key: ID "1" to "102" obtained from the data node 300 "N1" to the application 510.

It is to be noted that, when data sets are obtained from a plurality of different data nodes 300 with respect to the range retrieval, these may be collectively transferred to the application 510.

In addition, as another example, it is assumed that the application 510 instructs to perform range retrieval of Key: Name "AA" to "AC" in the sub table. In this case, the library 520 sends a data node query with target table: sub table and target Key: Name "AA" to "AC", to the control node 200.

The control unit 210 refers to the Key information 222 of FIG. 10, and extracts the identifier "N1" of the data node 300 in which data sets with respect to Key: Name "AA" to "AC" are stored in the sub table.

When the data node 300 "N1" is normal, the control unit 210 returns the identifier "N1" of the data node 300 with respect to Key: Name "AA" to "AC" to the client device 500.

The library 520 sends a data acquisition request to the data node 300 "N1" with target table: sub table and target Key: Name "AA" to "AC".

The data acquisition unit 330 of the data node 300 "N1" obtains a data set with respect to Key: Name "AA" <Key: Name "AA", Value: ID "301", Address "Toyama"> from the sub table in FIG. 9. Similarly, the data acquisition unit 330 obtains data sets with respect to Key: Name "AB" and "AC".

The data acquisition unit 330 returns the data sets with respect to Key: Name "AA" to "AC" to the client device 500.

In contrast, when failures occur at Step B202 (Step B202/N), the control unit 210 refers to the pieces of Key information 221, 222 according to the target Key, and extracts an identifier of the data node 300 in which a replica with respect to the target Key value is stored (Step B203).

For example, it is assumed that failures occur in the data node 300 "N1" when performing range retrieval of the above-described target table: main table and target Key: ID "1" to "102". In this case, the control unit 210 refers to the Key information 221 of FIG. 10, and extracts the identifier "N2" of the data node 300 in which the data sets (replicas) with respect to Key: ID "1" and "102" are stored in the main replica table and the sub table. Similarly, the control unit 210 extracts the identifier "N3" of the data node 300 in which the data sets with respect to Key: ID "2" and "3" are stored in the sub table.

The control unit 210 returns the identifier "N2" of the data node 300 with respect to Key: ID "1" and "102", and the identifier "N3" of the data node 300 with respect to Key: ID "2" and "3".

The library 520 specifies target table: main table and target Key: ID "1" and "102", and sends a data acquisition request to the data node 300 "N2". In addition, at the same time, the library 520 specifies target table: main table and target Key: ID "2" and "3", and sends a data acquisition request to the data node 300 "N3".

When the data set with respect to the target Key value is not stored in the target table at Step C201 (Step C201/N), the data acquisition unit 330 identifies another table that stores a replica of a data set with respect to the target Key value (Step C203). The data acquisition unit 330 refers to the pieces of Key information 221, 222 according to the target Key, and identifies a table that stores the replica of the data set with respect to the target Key value in the own data node 300.

For example, referring to the Key information 221 of FIG. 10, the data node 300 "N2" does not store the data sets with respect to Key: ID "1" and "102" in the main table. The data acquisition unit 330 of the data node 300 "N2" refers to the Key information 221 of FIG. 10, and identifies the main replica table and the sub table, respectively, as tables that store the replicas of the data sets with respect to Key: ID "1" and "102".

When the target Key and Key of the identified table are the same (Step C204/Y), the data acquisition unit 330 obtains a data set from the identified table, using the target Key value (Step C205).

For example, the data acquisition unit 330 of the data node 300 "N2" obtains the data set with respect to Key: ID "1" <Key: ID "1", Value: Name "AC", Address "Tokyo"> from the main replica table in FIG. 9.

In contrast, when the target Key and Key of the identified table are different (Step C204/N), the data acquisition unit 330 refers to the Key information 222, and identifies a Key value of the identified table with respect to the target Key value (Step C206). Then, the data acquisition unit 330 obtains a data set from the identified table, using the identified Key value (Step C207). Furthermore, the data acquisition unit 330 converts the obtained data set into the form of the data set with respect to the target Key (Step C208).

For example, the data acquisition unit 330 of the data node 300 "N2" refers to the Key information 222 of FIG. 10, and identifies Key: Name "BB" with respect to target Key: ID "102". The data acquisition unit 330 obtains a data set with respect to Key: Name "BB" <Key: Name "BB", Value: ID "102", Address "Okinawa">from the sub table in FIG. 9. The data acquisition unit 330 converts the data set into a data set <Key: ID "102", Value: Name "BB", Address "Okinawa">. The data acquisition unit 330 returns the data sets with respect to Key: ID "1" and "102" to the client device 500.

Similarly, the data acquisition unit 330 of the data node 300 "N3" also obtains data sets <Key: ID "2", Value: Name "ZZ", Address "Russia">and <Key: ID "3", Value: Name "UU", Address "America">, using the sub table. The data acquisition unit 330 returns the data sets with respect to Key: ID "2" and "3" to the client device 500.

From the above, the operation of the first exemplary embodiment of the present invention is completed.

It is to be noted that, in the above-described example, the case where a replica of a data set stored in the main table is obtained from the main replica table or the sub table was described. A replica of a data set stored in the sub table can also be obtained from the main table or the main replica table by a similar method.

In addition, in the above-described example, as in FIG. 9, the data sets with respect to Key: ID "1" in the main table and Key: Name "AC" in the sub table are the same in the data node 300 "N1". As just described, when the same data sets exist in the main table and the sub table of the same data node 300, a reference relationship with the data set in the main table may be set in the sub table. In this case, the data set is obtained from the main table, and is converted into the data set in the sub table.

Figure 1:
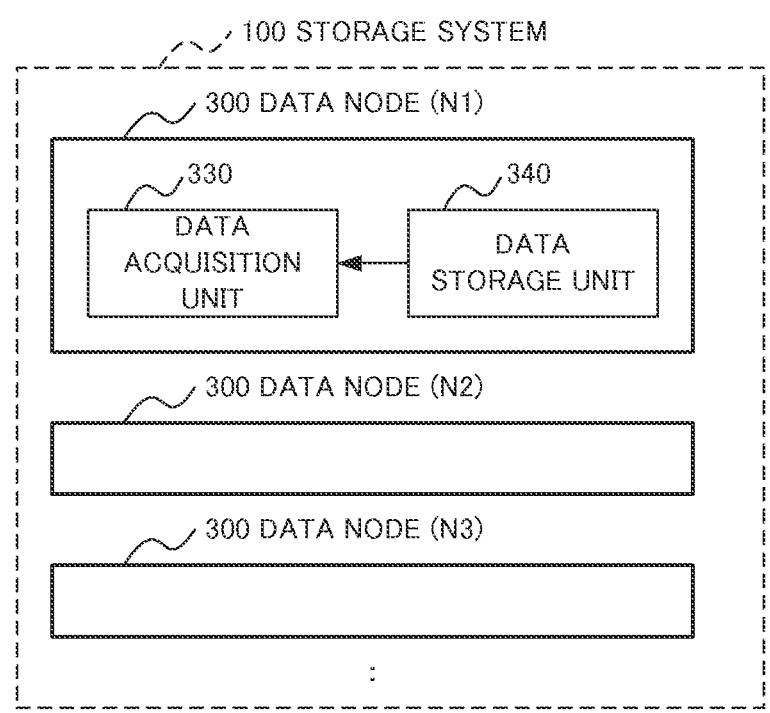
FIG. 1 is a block diagram illustrating a characteristic structure of a first exemplary embodiment of the present invention.

Next, a characteristic configuration of the first exemplary embodiment of the present invention is described. FIG. 1 is a block diagram illustrating a characteristic structure of the first exemplary embodiment of the present invention.

Referring to FIG. 1, a storage system 100 includes a plurality of data nodes 300. Each of the plurality of data nodes 300 includes a data storage unit 340 and a data acquisition unit 330.

The data storage unit 340 stores a part assigned to the data node 300 of each of first and second tables each of which stores a plurality of data sets. The first and second tables respectively use first and second data elements among a plurality of data elements of a data set as Key.

When a value of one data element of the first and second data elements is inputted, the data acquisition unit 330 obtains a data set including the inputted value from the part assigned to the data node 300 of a table that uses the one data element as Key among the first and second tables, using the inputted value as Key. Alternatively, the data acquisition unit 330 obtains a data set including the inputted value from the part assigned to the data node 300 of a table that uses the other data element as Key among the first and second tables, using a value of the other data element corresponding to the inputted value as Key.

Next, advantageous effects of the first exemplary embodiment of the present invention will be described.

In a distributed storage using a KVS (Key-Value Store) technique in order to obtain data sets, such as the above-described HBase, it is necessary to specify a specific Key such as the above-described RowKey. Thus, it is hard to obtain data sets by specifying a data element included in Value.

In order to obtain data sets by specifying a data element included in Value, for example, a new table data structure using the data element as Key needs to be constructed. In this case, including a replica, the same data structure is duplicated, and the efficiency becomes poor.

According to the first exemplary embodiment of the present invention, in a storage system, access with different Keys can be effectively achieved. The reason is as follows. The data storage unit 340 of each of the plurality of data nodes 300 stores the parts assigned to the data node 300 of the main table and the sub table which use values of different data elements of a data set as Key. When a value of one data element of the different data elements is inputted, the data acquisition unit 330 obtains a data set including the inputted value from the assigned part in the table that uses the one data element as Key among the main table and the sub table, using the inputted value as Key. Alternatively, the data acquisition unit 330 obtains a data set including the inputted value from the assigned part in the table that uses the other data element as Key among the main table and the sub table, using a value of the other data element corresponding to the inputted value as Key.

Accordingly, for example, in the sub table, if a replica of a data set stored in the main table is stored in a data node 300 different from that in the main table, the data set can be deleted from the main replica table. That is, the same data structure is not duplicated, and access to the storage system 100 is possible with Key different from Key of the main table while providing the replica of a data set.

In addition, in a distributed storage such as HBase, in order to obtain data sets by specifying a data element included in Value, other than Key, for example, there was a method using an index table that correlates the data element with Key. However, there was a problem in that access to a distributed storage using an index table becomes random access because Key values are not continuous in range retrieval, thereby resulting in a decrease in an access rate.

According to the first exemplary embodiment of the present invention, in a storage system, access with different Keys can be fast achieved. The reason is that, in the sub table, data sets are sorted depending on Key values of the sub table, and the data storage unit 340 of each data node 300 stores data sets of the assigned part in the sub table in the sorted order. Accordingly, access with respect to the data storage unit 340 becomes continuous access in range retrieval, and in particular, when the data storage unit 340 uses a HDD as a storage medium, the access rate is improved compared to the case of random access.

(Second Exemplary Embodiment)

Next, a second exemplary embodiment of the present invention will be described.

The second exemplary embodiment of the present invention differs from the first exemplary embodiment of the present invention in that data sets are assigned to each data node 300 in each block including one or more data sets.

First, a structure of the second exemplary embodiment of the present invention will be described. A block diagram illustrating the structure of the second exemplary embodiment of the present invention is the same as that in the first exemplary embodiment of the present invention (FIG. 2).

In the second exemplary embodiment of the present invention, the parts assigned to the respective data nodes 300 in the main table are divided into one or more blocks each of which includes one or more data sets. The number of the data sets included in each block may be a predetermined value defined by each data node 300 or a predetermined value defined by the storage system 100.

In addition, the number of the data sets included in each block may differ from block to block.

In addition, in the main replica table, each block in the main table is assigned to the data node 300 different from that in the main table.

FIG. 11 is a diagram illustrating an example of tables in the second exemplary embodiment of the present invention.

In the example of FIG. 11, in the main table, a block "B1" is formed by data sets of Key: ID "1", "2", "3", and "102" stored in the data node 300 "N1". Similarly, blocks "B2" and "B3" are formed by data sets stored in the data nodes 300 "N2" and "N3", respectively. In addition, in the main replica table, the blocks "B3", "B1", and "B2" are stored in the data nodes 300 "N1", "N2", and "N3", respectively.

In addition, in the sub table, each block in the main table is assigned to the same data node 300 as the main replica table. In addition, in the sub table, data sets in each block are sorted depending on Key values of the sub table.

FIG. 13 and FIG. 15 are diagrams illustrating other examples of the tables in the second exemplary embodiment of the present invention.

In the examples of FIG. 13 and FIG. 15, also in the sub table, the blocks "B3", "B1", and "B2" are stored in the data nodes 300 "N1", "N2", and "N3", respectively.

Figure 14:
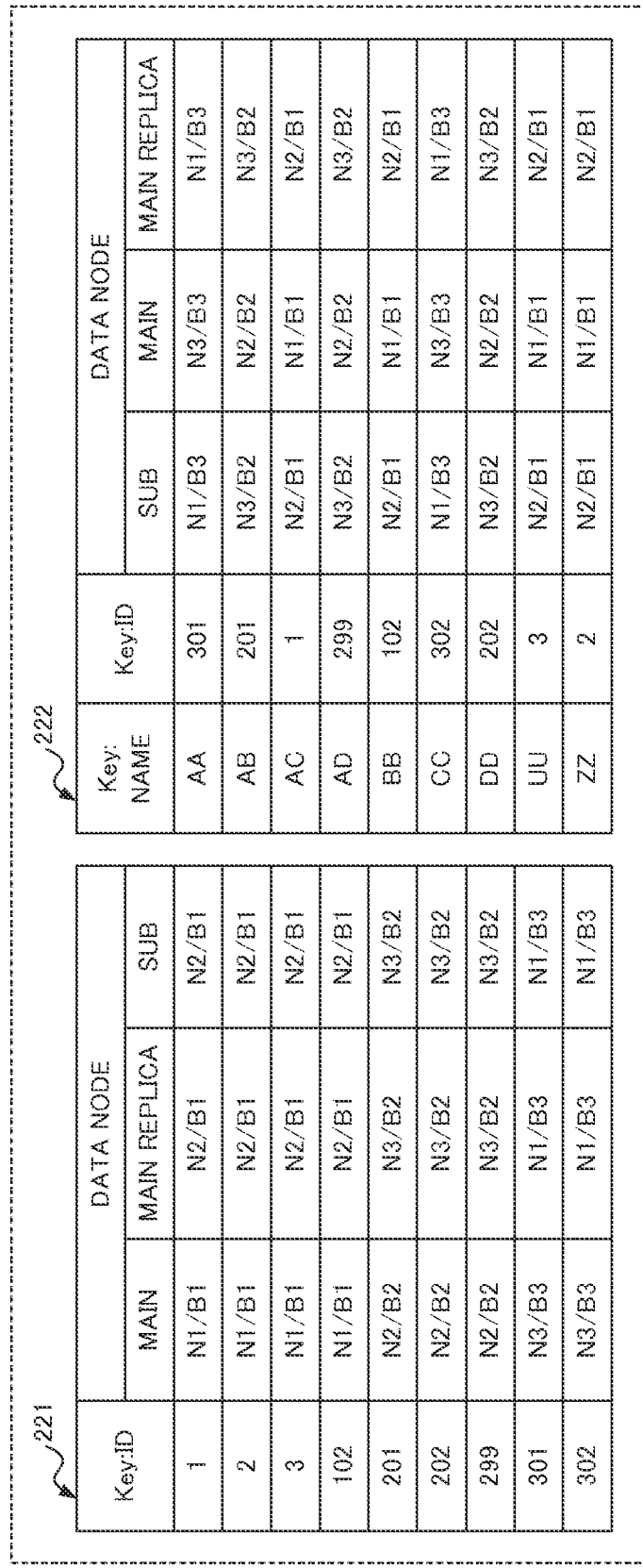
FIG. 14 is a diagram illustrating another example of the pieces of Key information 221, 222 in the second exemplary embodiment of the present invention.

FIG. 12, FIG. 14, and FIG. 16 are diagrams illustrating examples of pieces of Key information 221, 222 in the second exemplary embodiment of the present invention. The Key information 221 of FIG. 12 corresponds to the tables of FIG. 11. The pieces of Key information 221, 222 of FIG. 14 and FIG. 16 correspond to the tables of FIG. 13 and FIG. 15, respectively.

In addition to the identifier of the data node 300, an identifier of the block is provided in the "main", "main replica", and "sub" columns in the pieces of Key information 221, 222 in the second exemplary embodiment of the present invention.

The table creation unit 310 of the data node 300 stores the respective data sets in each block of the assigned part in the sub table in the data storage unit 340, in the sorted order in each block.

Next, the operation of the second exemplary embodiment of the present invention will be described.

<Sub Table Creation Processing>

First, sub table creation processing in the second exemplary embodiment of the present invention will be described.

It is assumed that the main table and the main replica table that use ID as Key are stored in the data storage unit 340 of each data node 300, as in FIG. 11. In addition, it is assumed that, with respect to these tables, the Key information 221 as in FIG. 12 is stored in the Key information storage unit 220.

In the second exemplary embodiment of the present invention, Key values of the sub table are assigned such that the same blocks in the main replica table and the sub table are stored in the same data node 300, at Step B102 of the sub table creation processing of the first exemplary embodiment (FIG. 3).

For example, in the Key information 222 of FIG. 14, the control unit 210 assigns Key: Name "AA" and "CC" included in the block "B3" to the data node 300 "N1". In addition, the control unit 210 assigns Key: Name "AC", "BB", "UU", and "ZZ" included in the block "B1" to the data node 300 "N2", and Key: Name "AB", "AD", and "DD" included in the block "B2" to the data node 300 "N3".

The table creation unit 310 of the data node 300 "N1" stores a data set with respect to Key: Name "AA" in the Key information 222 of FIG. 14 in the sub table in the data storage unit 340, as in FIG. 13. Similarly, the table creation unit 310 stores a data set with respect to Key: Name "CC" next to the data set of Key: Name "AA" in the data storage unit 340. Similarly, the data nodes 300 "N2" and "N3" also store the assigned parts in the sub table in the data storage unit 340. As a result, the sub table is created and stored in the data nodes 300 "N1", "N2", and "N3", as in FIG. 13.

Furthermore, the control unit 210 deletes the assignment of a redundant data set to the data node 300 in the main replica table, from the pieces of Key information 221, 222, as in FIG. 16.

The data nodes 300 "N1", "N2", and "N3" delete redundant data sets from the main replica table, based on the Key information 221 of FIG. 16, as in FIG. 15.

<Data Readout Processing>

Next, data readout processing in the second exemplary embodiment of the present invention will be described.

The data readout processing in the second exemplary embodiment of the present invention is the same as that in the first exemplary embodiment of the present invention (FIG. 4).

For example, it is assumed that the application 510 instructs to perform range retrieval of Key: Name "AA" to "AD" in the sub table. In this case, the library 520 sends a data node query with target table: sub table and target Key: Name "AA" to "AD", to the control node 200.

The control unit 210 refers to the Key information 222 of FIG. 16, and extracts the identifier "N1" of the data node 300 in which Key: Name "AA" is stored in the sub table. In addition, the control unit 210 extracts the identifier "N3" of the data node 300 in which Key: Name "AB" and "AD" are stored and the identifier "N2" of the data node 300 in which Key: Name "AC" is stored in the sub table.

The control unit 210 returns the data node 300 "N1" with respect to Key: Name "AA", the data node 300 "N3" with respect to Key: Name "AB" and "AD", and the data node 300 "N2" with respect to Key: Name "AC" to the client device 500.

The library 520 sends a data acquisition request to the data node 300 "N1" with target table: sub table and target Key: Name "AA". In addition, at the same time, the library 520 sends a data acquisition request to the data node 300 "N3" with target table: sub table and target Key: Name "AB" and "AD". Furthermore, at the same time, the library 520 sends a data acquisition request to the data node 300 "N2" with target table: sub table and target Key: Name "AC".

The data acquisition unit 330 of the data node 300 "N1" obtains a data set with respect to Key: Name "AA" <Key: Name "AA", Value: ID "301", Address "Toyama"> from the sub table in FIG. 15, and returns the obtained data set to the client device 500. Similarly, the data acquisition unit 330 of the data node 300 "N3" obtains data sets with respect to Key: Name "AB" and "AD" from the sub table, and returns the obtained data sets to the client device 500. The data acquisition unit 330 of the data node 300 "N2" obtains a data set with respect to Key: Name "AC" from the sub table, and returns the obtained data set to the client device 500.

The library 520 of the client device 500 collectively transfers the data sets with respect to Key: Name "AA" to "AD" obtained from the data nodes 300 "N1", "N2", and "N3" to the application 510.

From the above, the operation of the second exemplary embodiment of the present invention is completed.

Next, advantageous effects of the second exemplary embodiment of the present invention will be described.

According to the second exemplary embodiment of the present invention, even when data sets are managed in each block, access with different Keys can be efficiently executed and executed fast. The reason is that the library 520 performs simultaneous access to a plurality of blocks, and the data storage unit 340 stores data sets in each block in the sorted order of Key values of the sub table. Accordingly, processing with respect to the plurality of blocks is concurrently run in range retrieval, and furthermore, access with respect to the data storage unit 340 becomes continuous access, and the access rate is more improved.

(Third Exemplary Embodiment)

Next, a third exemplary embodiment of the present invention will be described.

The third exemplary embodiment of the present invention differs from the second exemplary embodiment of the present invention in that data sets read out from the storage system 100 are sorted using a sorting buffer.

First, a structure of the third exemplary embodiment of the present invention will be described.

Figure 17:
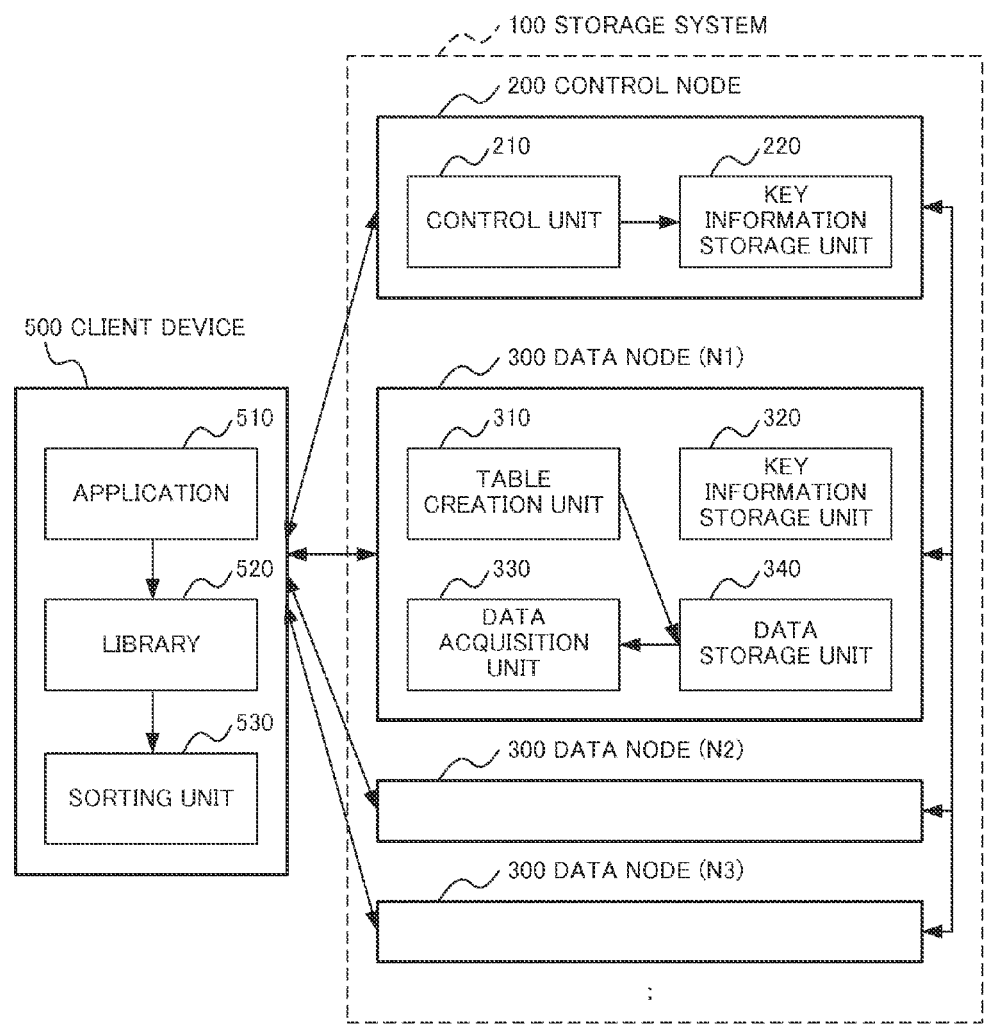
FIG. 17 is a block diagram illustrating a structure of a third exemplary embodiment of the present invention.

FIG. 17 is a block diagram illustrating the structure of the third exemplary embodiment of the present invention. Referring to FIG. 17, the client device 500 in the third exemplary embodiment of the present invention further includes a sorting unit 530.

The sorting unit 530 performs sorting processing of data sets using the sorting buffer. In the case of performing acquisition of data sets with respect to all Keys or Keys in a specific range in the sub table (range retrieval), the sorting unit 530 sorts data sets obtained from the data node 300 depending on Key values of the sub table.

It is to be noted that the storage system 100 may include the sorting unit 530 in place of the client device 500.

In addition, in the third exemplary embodiment of the present invention, in the sub table, blocks are sorted depending on Key values of first data sets, and are assigned to the data nodes 300 in order of the identifiers of the data nodes 300. The first data sets indicate first data sets of the respective blocks when sorting data sets in the respective blocks depending on Key of the sub table.

FIG. 19 and FIG. 21 are diagrams illustrating examples of tables in the third exemplary embodiment of the present invention. In the examples of FIG. 19 and FIG. 21, in the sub table, the block "B3" in which Key of the first data set is Name "AA" is stored in the data node 300 "N1". In addition, the block "B2" in which Key of the first data set is Name "AB" is stored in the data node 300 "N2", and the block "B1" in which Key of the first data set is Name "AC" is stored in the data node 300 "N3".

Figure 22:
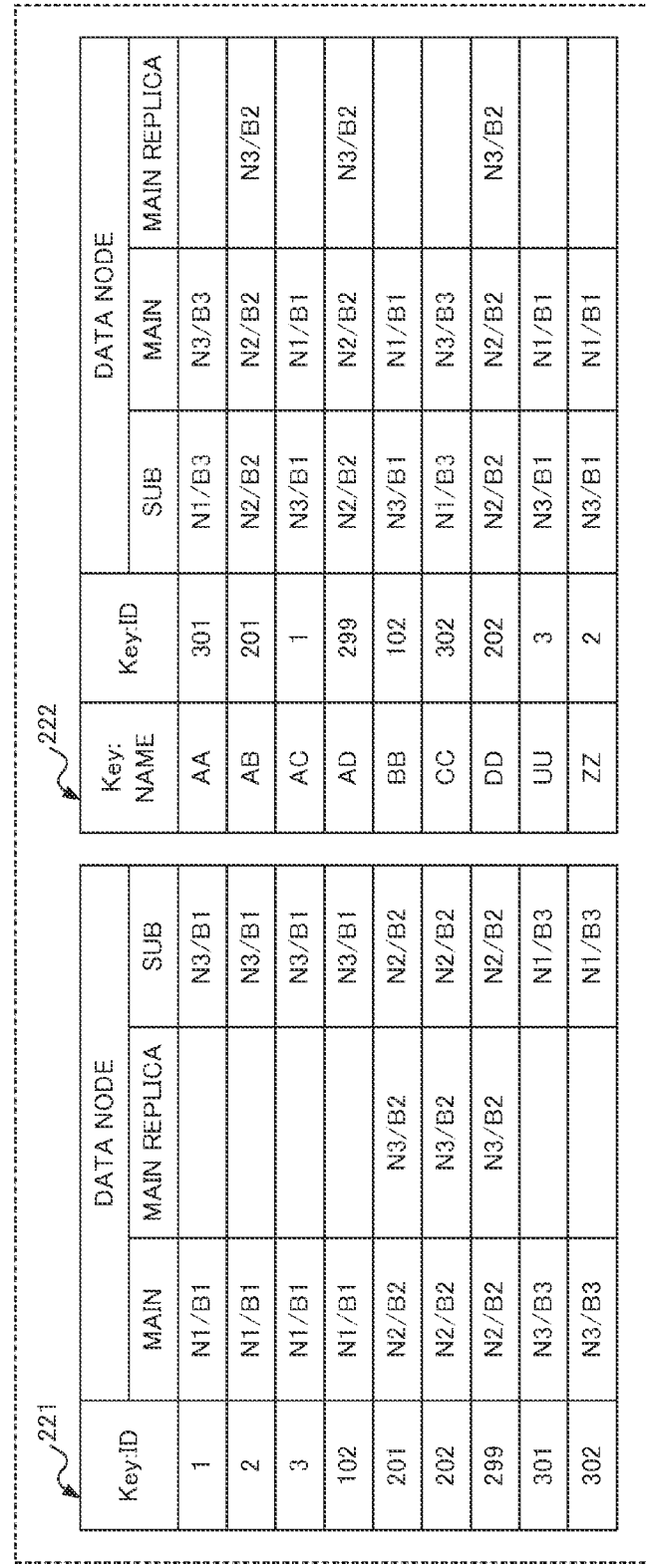
FIG. 22 is a diagram illustrating an example of the pieces of Key information 221, 222 in the third exemplary embodiment of the present invention.

FIG. 20 and FIG. 22 are diagrams illustrating examples of pieces of Key information 221, 222 in the third exemplary embodiment of the present invention. The pieces of Key information 221, 222 of FIG. 20 and FIG. 22 correspond to the tables of FIG. 19 and FIG. 21, respectively.

Next, the operation of the third exemplary embodiment of the present invention will be described.

<Sub Table Creation Processing>

First, sub table creation processing in the third exemplary embodiment of the present invention will be described.

As in the second exemplary embodiment of the present invention, it is assumed that the main table and the main replica table that use ID as Key are stored in the data storage unit 340 of each data node 300, as in FIG. 11. In addition, it is assumed that, with respect to these tables, the Key information 221 as in FIG. 12 is stored in the Key information storage unit 220.

In the third exemplary embodiment of the present invention, the blocks are sorted depending on the Key values of the first data sets, and are assigned to the data nodes 300 in order of the identifiers of the data nodes 300, at Step B102 of the sub table creation processing of the second exemplary embodiment (FIG. 3).

For example, in the blocks "B1", "B2", and "B3" of FIG. 11, Key: Name of the first data sets are "AC", "AB", and "AA", respectively. Thus, in the Key information 222 of FIG. 20, the control unit 210 assigns the data sets of the blocks "B3", "B2", and "B1" to the data nodes 300 "N1", "N2", and "N3", respectively. That is, the control unit 210 assigns Key: Name "AA" and "CC" included in the block "B3" to the data node 300 "N1". In addition, the control unit 210 assigns Key: Name "AB", "AD", and "DD" included in the block "B2" to the data node 300 "N2". The control unit 210 assigns Key: Name "AC", "BB", "UU", and "ZZ" included in the block "B1" to the data node 300 "N3".

The data nodes 300 "N1", "N2", and "N3" create the sub table as in FIG. 19, based on the Key information 222 of FIG. 20.

Furthermore, the control unit 210 deletes the assignment of a redundant data set to the data node 300 in the main replica table, from the pieces of Key information 221, 222, as in FIG. 22.

The data nodes 300 "N1", "N2", and "N3" delete redundant data sets from the main replica table, based on the Key information 221 of FIG. 22, as in FIG. 21.

<Data Readout Processing>

Next, data readout processing in the third exemplary embodiment of the present invention will be described.

The operation will be described by taking the case where the application 510 of the client device 500 performs acquisition of data sets with respect to all Key values of the sub table for the storage system 100, as an example.

Figure 18:
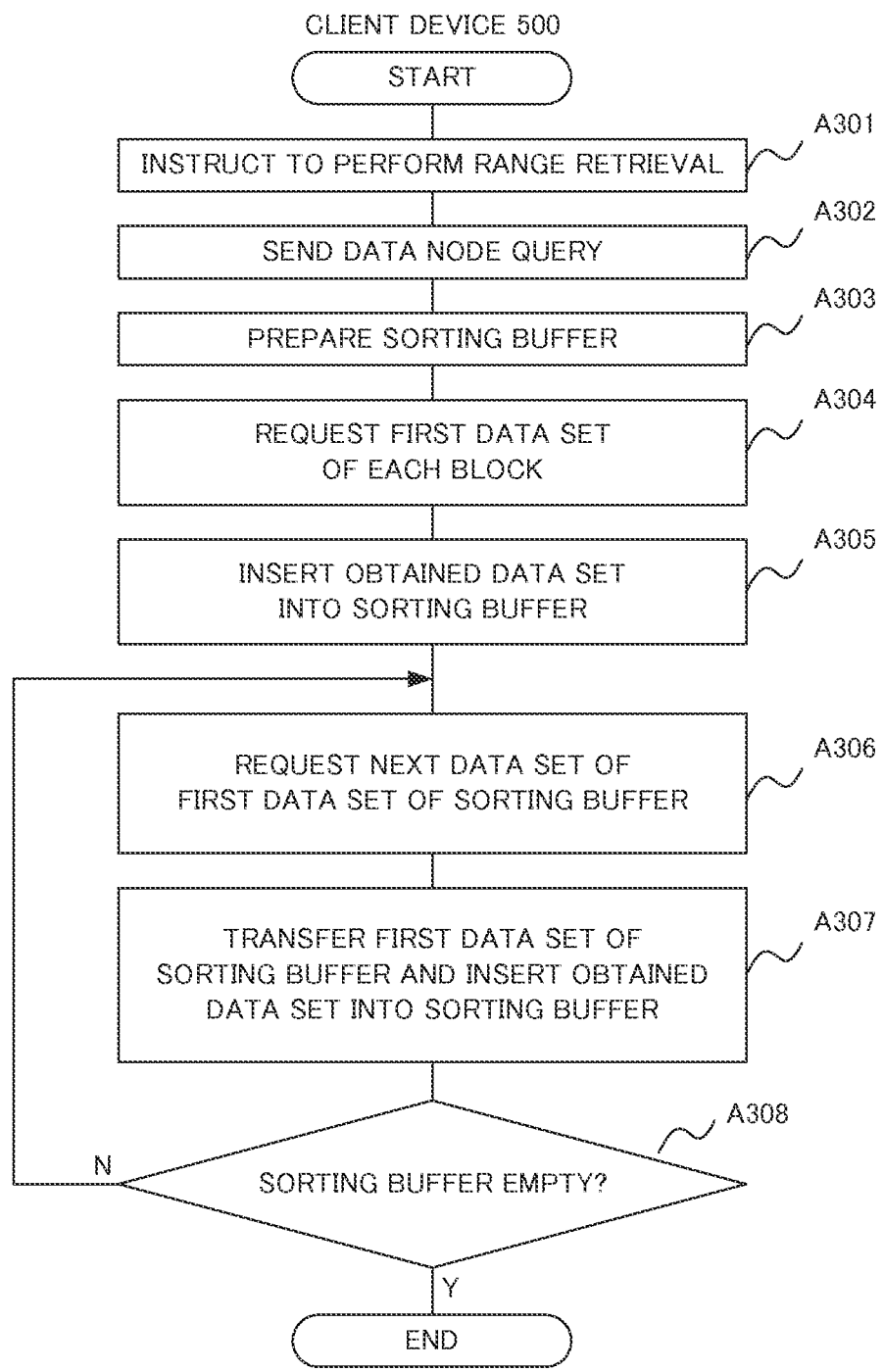
FIG. 18 is a flowchart illustrating data readout processing in the third exemplary embodiment of the present invention.

FIG. 18 is a flowchart illustrating data readout processing in the third exemplary embodiment of the present invention.

First, in the client device 500, processing until the library 520 sends a data node query (Steps A301, A302) is the same as that in the first and second exemplary embodiments of the present invention (FIG. 4, Steps A201, A202).

For example, the library 520 specifies target table: sub table and target Key: Name "A11", and sends a data node query to the control node 200.

The control unit 210 refers to the Key information 222 of FIG. 22, extracts the first Key value of each block and the identifier of the data node 300 in which data sets of the block are stored, and returns the extracted data sets to the client device 500.

For example, the control unit 210 returns the data node 300 "N1" with respect to Key: Name "AA", the data node 300 "N2" with respect to Key: Name "AB", and the data node 300 "N3" with respect to Key: Name "AC" to the client device 500.

The sorting unit 530 of the client device 500 prepares a sorting buffer having a size of the number of blocks (A303).

Figure 23:
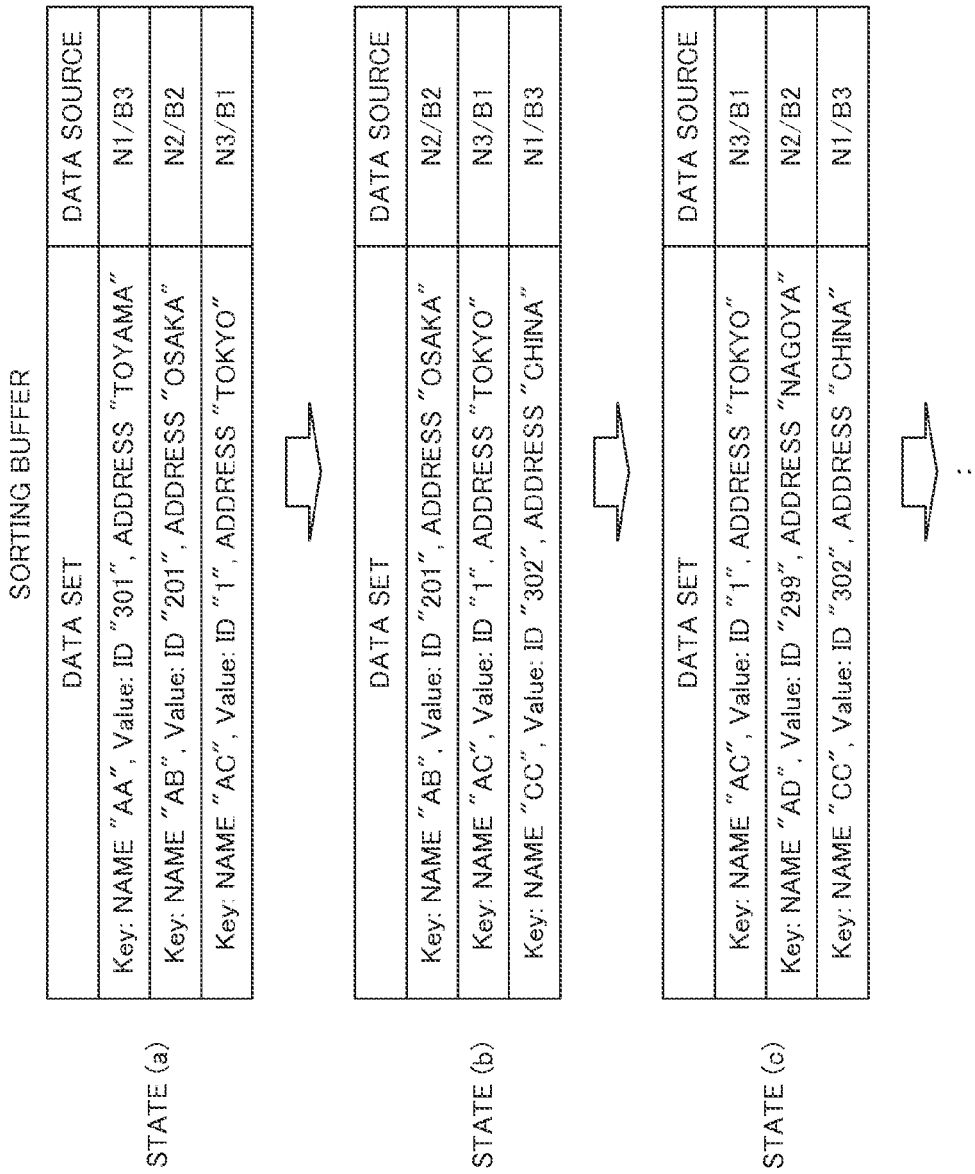
FIG. 23 is a diagram illustrating an example of a sorting buffer in the third exemplary embodiment of the present invention.

FIG. 23 is a diagram illustrating an example of a sorting buffer in the third exemplary embodiment of the present invention.

For example, the control unit 210 prepares a sorting buffer having a size "3", as in FIG. 23.

With respect to the data node 300 that stores data sets of each block, the sorting unit 530 specifies the sub table and the first Key value of the block, and requests the first data set of the block (A304).

For example, the sorting unit 530 sends a data acquisition request to the data nodes 300 "N1", "N2", and "N3" with first Key: Name "AA", "AB", and "AC", respectively.

The data acquisition unit 330 of each data node 300 obtains a data set with respect to the first Key value from the sub table, and returns the obtained data set to the client device 500.

For example, the data acquisition units 330 of the data nodes 300 "N1", "N2", and "N3" obtain data sets with respect to Key: Name "AA", "AB", and "AC", respectively, from the sub table of FIG. 21, and return the obtained data sets to the client device 500.

The sorting unit 530 inserts the data sets obtained from the respective data nodes 300 into the sorting buffer in order of the identifiers of the data nodes 300 (A305).

For example, the sorting unit 530 inserts the obtained data sets in order of the identifiers of the data nodes 300, as the state (a) of FIG. 23.

At this time, the first data set (Key: Name "AA") of the sorting buffer is the first data set in range retrieval. In addition, in the sorting buffer, the data sets are sorted depending on the Key values of the sub table.

For the data node 300 from which the first data set in the sorting buffer is obtained, the sorting unit 530 requests a next data set in the block that has contained the data set (A306).

For example, the sorting unit 530 requests a next data set to the data node 300 "N1" from which the first data set (Key: Name "AA") is obtained.

If there is a next data set, the data acquisition unit 330 of the data node 300 returns the data set to the client device 500.

For example, the data acquisition unit 330 of the data node 300 "N1" obtains a data set with respect to next Key: Name "CC" from the sub table of FIG. 21, and returns the obtained data set to the client device 500.

The sorting unit 530 transfers the first data set of the sorting buffer to the application 510 via the library 520, and inserts the data set obtained from the data node 300 into the sorting buffer. The sorting unit 530 inserts the data set while sorting depending on the Key value (A307).

For example, the sorting unit 530 transfers the data set with respect to Key: Name "AA" to the application 510, and inserts the data set with respect to Key: Name "CC" into the sorting buffer, as the state (b) of FIG. 23.

The sorting unit 530 repeats processing of Steps A306 and A307 until the sorting buffer becomes empty (A308).

For example, for the data node 300 "N2" from which the first data set (Key: Name "AB") is obtained, the sorting unit 530 requests a next data set.

The data acquisition unit 330 of the data node 300 "N2" obtains a data set with respect to next Key: Name "AD" from the sub table of FIG. 21, and returns the obtained data set to the client device 500.

The sorting unit 530 transfers the data set with respect to Key: Name "AB" to the application 510 via the library 520, and sets the data set with respect to Key: Name "AD", as the state (c) of FIG. 23.

From the above, the operation of the third exemplary embodiment of the present invention is completed.

It is to be noted that, in the above-described example, the case of performing acquisition of data sets with respect to all Key values of the sub table was described. In the case of performing acquisition of data sets with respect to values in a specific range, in the above-described Step A305, the library 520 sorts data sets obtained from each data node 300 depending on Key values and inserts the data sets into the sorting buffer.

In addition, when there are a plurality of blocks assigned to the data node 300 in the sub table, the data node 300 may merge the plurality of blocks into a large block. By sorting data sets in the large block depending on Key values, the continuity of the Key values can be further improved.

Next, advantageous effects of the third exemplary embodiment of the present invention will be described.

According to the third exemplary embodiment of the present invention, data sets sorted depending on Key values can be obtained in range retrieval without increasing a load. The reason is that, the sorting unit 530 obtains data sets in order from each block, and sorts the obtained data sets in order of the Key values and outputs the sorted data sets in order, in the sorting buffer having a length of the number of blocks.

In addition, according to the third exemplary embodiment of the present invention, data sets sorted depending on Key values can be fast obtained in retrieval that specifies all Key values. The reason is that, in the sub table, blocks are sorted depending on Key values of first data sets, and are assigned to the data nodes 300 in order of the identifiers of the data nodes 300. Accordingly, a list of the sorted data sets is obtained only by inserting the first data sets in the respective blocks into the sorting buffer in order of the identifiers of the data nodes 300 by the sorting unit 530.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A storage system comprising a plurality of data nodes, wherein each of the plurality of data nodes includes:
   a memory storing instructions, and
   one or more processors configured to execute the instructions to:
   store a part assigned to the data node of each of first and second tables each of which stores a plurality of data sets, the first and second tables respectively using first and second data elements among a plurality of data elements of a data set as Key;
   obtain, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses other data element as Key among the first and second tables, using a value of the other data element corresponding to the inputted value as Key, and
   output the obtained data set, wherein,
   in each of the plurality of data nodes, the one or more processors are configured to further execute the instructions to store a part assigned to the data node of a third table that is a table that stores the plurality of data sets using the value of the first data element as Key, in which each data set is assigned to a data node different from the assigned data node in the first table, and
   when one data set is assigned to different data nodes in the first table and the second table, the data set is deleted from the third table.

2. The storage system according to claim 1, wherein, in each of the plurality of data nodes, the data set including the inputted value is obtained from the part assigned to the data node of the table that uses the other data element as Key, using the value of the other data element of the data set including the inputted value as Key.

3. The storage system according to claim 1, wherein one or more data sets of the part assigned to each of the plurality of data nodes in the first table is further divided into one or more blocks, and the second table is assigned to the plurality of data nodes in each block.

4. The storage system according to claim 3, wherein the data sets of the first table are arranged in order of values of the first data element in the first table, and the data sets of the second table are arranged in order of values of the second data element in the block, and
in each of the plurality of data nodes, the data sets of the part assigned to the data node of the first table are stored in order of the values of the first data element in the first table, and the data sets of the block of the part assigned to the data node of the second table are stored in order of the values of the second data element in the block.

5. The storage system according to claim 3, wherein
the one or more processors configured to further execute the instructions to obtain, when a range of the values of the second data element is inputted, data sets in order, from each of a plurality of blocks that store data sets including the values in the range, which are stored in the one or more data nodes, sorts the obtained data set in order of the values of the second data element, and output the sorted data set in order.

6. The storage system according to claim 1, further comprising a control node that includes:
a memory storing instructions, and
one or more processors configured to execute the instructions to, when a value of the one data element is inputted, output an identifier of the data node to which a data set including the value of the one data element is assigned in the first or second table.

7. The storage system according to claim 1, wherein
the data sets of the first table and the second table are arranged in order of values of the first data element and values of the second data element in the first table and the second table, respectively, and
in each of the plurality of data nodes, the data sets of the parts assigned to the data node of the first table and the second table are stored in order of the values of the first data element in the first table and in order of the values of the second data element in the second table, respectively.

8. A storage method for a storage system including a plurality of data nodes comprising:
in each of the plurality of data nodes,
storing a part assigned to the data node of each of first and second tables each of which stores a plurality of data sets, the first and second tables respectively using first and second data elements among a plurality of data elements of a data set as Key;
obtaining, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses other data element as Key among the first and second tables, using a value of the other data element corresponding to the inputted value as Key;
outputting the obtained data set, wherein the storage method further comprises, in each of the plurality of data nodes,
storing a part assigned to the data node of a third table that is a table that stores the plurality of data sets using the value of the first data element as Key, in which each data set is assigned to a data node different from the assigned data node in the first table, and
when one data set is assigned to different data nodes in the first table and the second table, deleting the data set from the third table.

9. A non-transitory computer readable storage medium recording thereon a program for a storage system including a plurality of data nodes, causing a computer of each of the plurality of data nodes to perform a method comprising:
storing a part assigned to the data node of each of first and second tables each of which stores a plurality of data sets, the first and second tables respectively using first and second data elements among a plurality of data elements of a data set as Key;
obtaining, when a value of one data element of the first and second data elements is inputted, a data set including the inputted value from the part assigned to the data node of a table that uses the one data element as Key among the first and second tables, using the inputted value as Key, or a data set including the inputted value from the part assigned to the data node of a table that uses other data element as Key among the first and second tables, using a value of the other data element corresponding to the inputted value as Key; and
outputting the obtained data set, wherein the method further comprises:
storing a part assigned to the data node of a third table that is a table that stores the plurality of data sets using the value of the first data element as Key, in which each data set is assigned to a data node different from the assigned data node in the first table, and
when one data set is assigned to different data nodes in the first table and the second table, deleting the data set from the third table.

* * * * *